United States Patent
Yamazaki

(10) Patent No.: US 11,187,812 B2
(45) Date of Patent: Nov. 30, 2021

(54) POSITIONING METHOD AND POSITIONING TERMINAL

(71) Applicant: PANASONIC INTELLECTUAL PROPERTY MANAGEMENT CO., LTD., Osaka (JP)

(72) Inventor: Yasuhisa Yamazaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 137 days.

(21) Appl. No.: 16/616,137

(22) PCT Filed: Apr. 27, 2018

(86) PCT No.: PCT/JP2018/017140
§ 371 (c)(1),
(2) Date: Nov. 22, 2019

(87) PCT Pub. No.: WO2019/003623
PCT Pub. Date: Jan. 3, 2019

(65) Prior Publication Data
US 2020/0081135 A1    Mar. 12, 2020

(30) Foreign Application Priority Data
Jun. 29, 2017  (JP) .............................. JP2017-127921

(51) Int. Cl.
*G01S 19/43*  (2010.01)
*G01S 19/07*  (2010.01)
(Continued)

(52) U.S. Cl.
CPC ............ *G01S 19/43* (2013.01); *G01S 19/071* (2019.08); *G01S 19/41* (2013.01); *G01S 19/49* (2013.01); *H01Q 1/125* (2013.01)

(58) Field of Classification Search
CPC ........ G01S 19/396; G01S 19/44; G01S 19/43; G01S 19/071; G01S 19/41; G01S 19/49; G01S 19/55; H01Q 1/125
See application file for complete search history.

(56) References Cited

U.S. PATENT DOCUMENTS

| | | | |
|---|---|---|---|
| 2004/0130485 A1* | 7/2004 | Rapoport | ................ G01S 19/44 342/357.27 |
| 2013/0135145 A1* | 5/2013 | Iwase | ...................... G01S 19/44 342/357.27 |
| 2017/0363746 A1 | 12/2017 | Kadoya | |

FOREIGN PATENT DOCUMENTS

| | | |
|---|---|---|
| JP | 10-062512 | 3/1998 |
| JP | 2001-099910 | 4/2001 |

(Continued)

OTHER PUBLICATIONS

P.J.G. Teunissen et al., On the Foundation of the Popular Ratio Test for GNSS Ambiguity Resolution, ION GNSS 17th International Technical Meeting of the Satellite Division, Sep. 21-24, 2004, p. 2529-2540, (Year: 2004).*

(Continued)

*Primary Examiner* — Bernarr E Gregory
*Assistant Examiner* — Fred H Mull
(74) *Attorney, Agent, or Firm* — Greenblum & Bernstein, P.L.C.

(57) ABSTRACT

In a case where a first RTK positioning solution is a fixed solution and a second RTK positioning solution is a float solution, a processor estimates a position of a second receiver based on the first RTK positioning solution, inter-antenna distance, and antenna azimuth angle to set an area within a circle with radius centered on the estimated position as a search range. Next, the processor calculates an integer ambiguity within the search range obtained in the RTK calculation as a second RTK positioning solution. Then, the (Continued)

processor outputs the first RTK positioning solution and the second RTK positioning solution as positioning solutions (current coordinates of a moving object).

7 Claims, 5 Drawing Sheets

(51) Int. Cl.
  *G01S 19/41* (2010.01)
  *G01S 19/49* (2010.01)
  *H01Q 1/12* (2006.01)

(56) References Cited

FOREIGN PATENT DOCUMENTS

| | | |
|---|---|---|
| JP | 2010-071686 | 4/2010 |
| WO | 2016/121058 | 8/2016 |

OTHER PUBLICATIONS

P.J.G. Teunissen et al., The GNSS Ambiguity Ratio-test Revisited: A Better Way of Using It, Survey Review, vol. 41(312), p. 138-151, Apr. 2009 (Year: 2009).*
International Search Report issued in International Pat. Appl. No. PCT/JP2018/017140, dated Aug. 7, 2018.

* cited by examiner

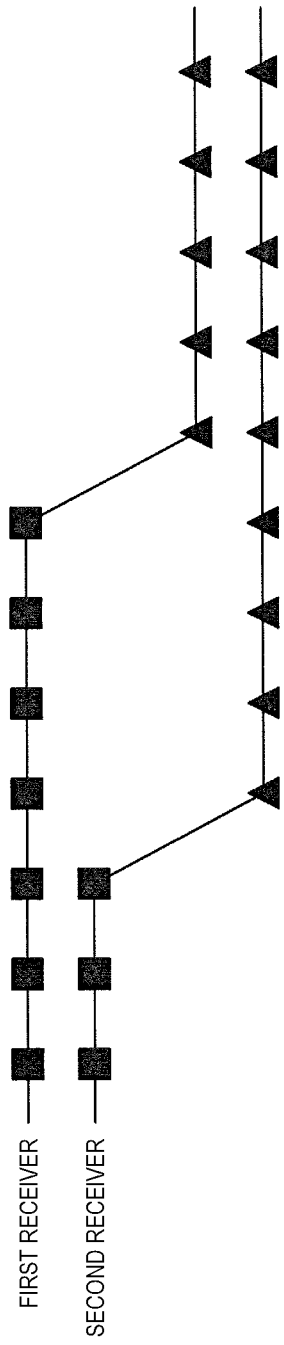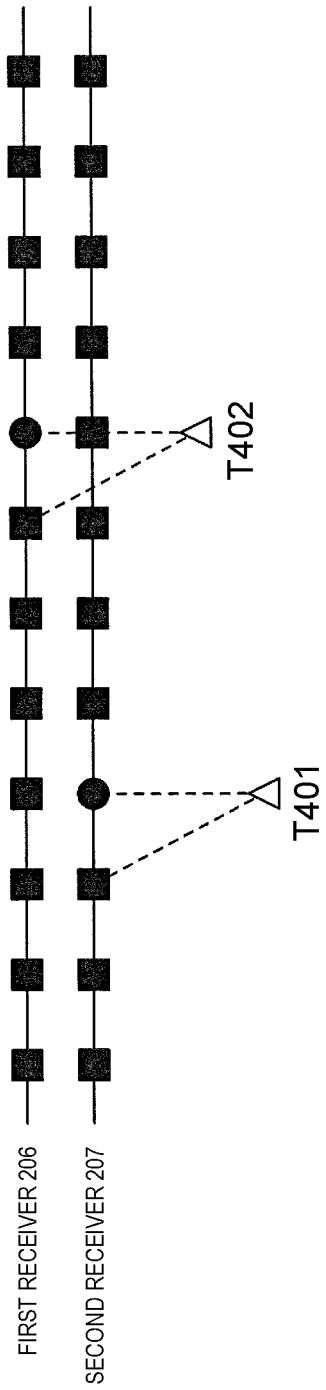

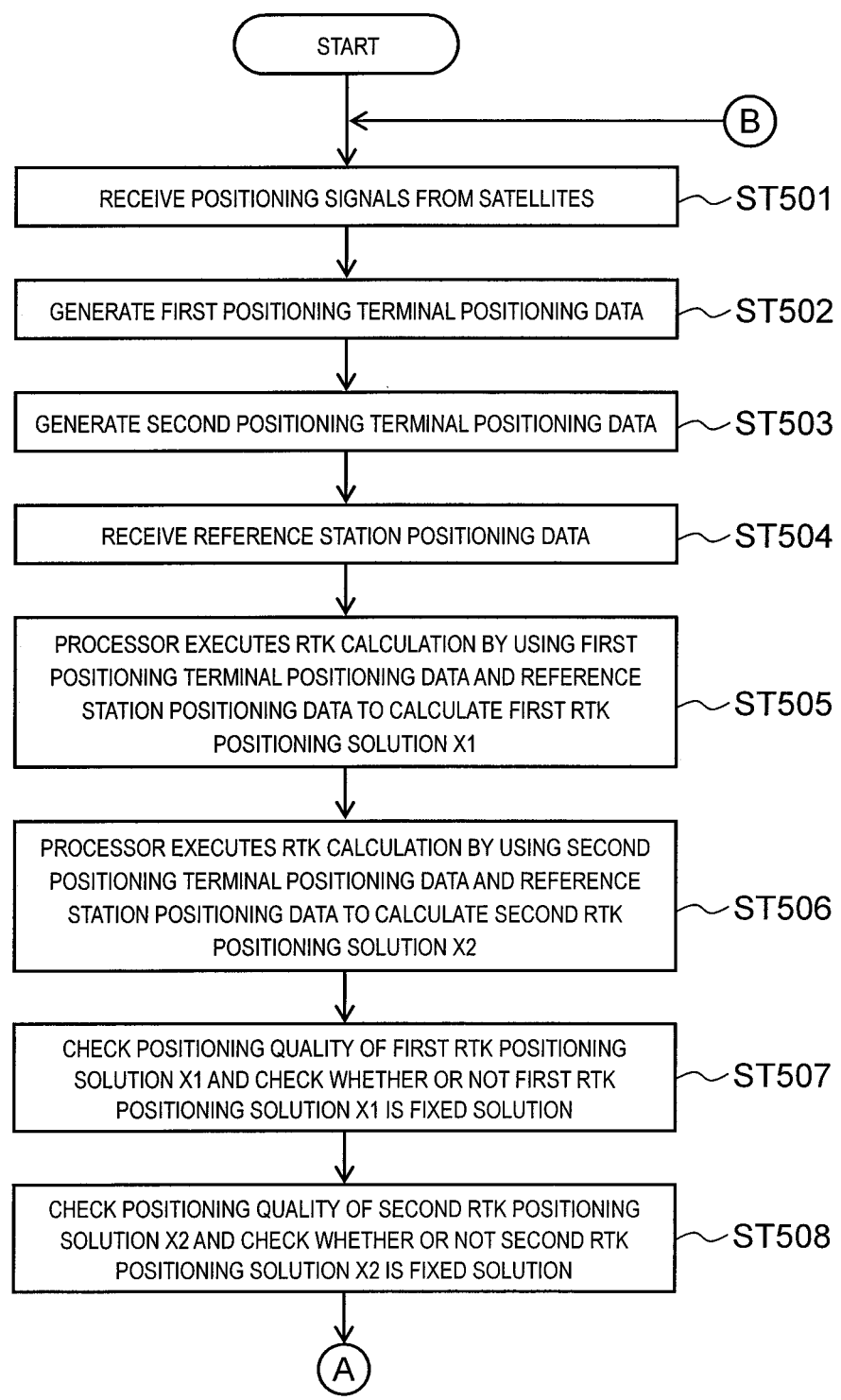

POSITIONING METHOD AND POSITIONING TERMINAL

TECHNICAL FIELD

The present disclosure relates to a positioning method and a positioning terminal when performing interference positioning by using a signal from a positioning satellite (hereafter, artificial satellites that can be used for positioning are collectively referred to as "satellite").

BACKGROUND ART

In the related art, in order to measure an object in a stationary state with high accuracy, interference positioning (RTK calculation) using a real time kinematic (RTK) method has been used. The RTK method is to perform positioning at a predetermined point by using a carrier phase integrated value of a positioning signal transmitted by a satellite. It is expected that high accurate positioning of a moving object is realized by applying the interferometric positioning by the RTK method to the positioning of the moving object.

A positioning terminal attached to the moving object such as a vehicle receives a positioning signal from a satellite (not shown) of a global navigation satellite system (GNSS) when performing an RTK calculation. GNSS is a generic term for satellite navigation systems with performance (accuracy and reliability) usable for civil aviation navigation such as global positioning system (GPS), BeiDou, GLONASS, and the like. The positioning signal includes a L1 signal (1575.42 MHz), a L2 signal (1227.60 MHz), and the like transmitted from the GPS satellite.

PTL 1 discloses a positioning terminal that obtains the center of a search range of a solution based on a position before positioning of a moving object, the speed vector of the moving object, and the time interval for calculating the speed vector, limits the search range, and determines an integer ambiguity of a positioning signal from a satellite by RTK calculation.

PTL 2 discloses a positioning terminal that uses the positioning signals from satellites received by each of a plurality of receivers (antennas) to calculate a positioning solution and determines whether each positioning solution is a highly accurate positioning solution (fixed solution) or a low-precision positioning solution (float solution).

CITATION LIST

Patent Literature

PTL 1: Japanese Patent Unexamined Publication No. 2010-71686

PTL 2: Japanese Patent Unexamined Publication No. 10-62512

SUMMARY OF THE INVENTION

Technical Problem

In an environment such as an urban area where there is a lot of shielding, the rate at which a float solution is calculated in an RTK calculation tends to increase.

One aspect of the present disclosure discloses a positioning method and a positioning terminal that can reduce the rate at which a float solution is calculated and increase the rate at which a fixed solution is calculated in the RTK calculation.

Solutions to Problem

A positioning method according to one aspect of the present disclosure is a positioning method for determining coordinates of a moving object by performing a positioning calculation based on information included in positioning signals transmitted from a plurality of satellites and received by a plurality of antennas. The method includes calculating a float solution that is a solution obtained by the positioning calculation and by estimating a position of the moving object or a fixed solution that is a solution obtained by increasing an accuracy of the float solution for each antenna, and in a case where a float solution is calculated for a first antenna and a fixed solution is calculated for a second antenna, estimating a position of the first antenna based on the fixed solution of the second antenna and estimating a fixed solution of the first antenna by increasing the accuracy of the float solution of the first antenna in a search range including the estimated position of the first antenna.

A positioning terminal according to one aspect of the present disclosure includes a processor that determines coordinates of a moving object by performing a positioning calculation based on information included in positioning signals transmitted from a plurality of satellites and received by a plurality of antennas. The processor calculates a float solution that is a solution obtained by the positioning calculation and by estimating a position of the moving object or a fixed solution that is a solution obtained by increasing an accuracy of the float solution for each antenna, and in a case where a float solution is calculated for a first antenna and a fixed solution is calculated for a second antenna, estimates a position of the first antenna based on the fixed solution of the second antenna and estimates a fixed solution of the first antenna by increasing the accuracy of the float solution of the first antenna in a search range including the estimated position of the first antenna.

Advantageous Effect of Invention

According to one aspect of the present disclosure, in an RTK calculation, it is possible to reduce the rate at which a float solution is calculated and increase the rate at which a fixed solution is calculated.

BRIEF DESCRIPTION OF DRAWINGS

FIG. 4A is a diagram showing a coordinate output example of related art.

FIG. 4B is a diagram showing an example of coordinate output according to the embodiment.

FIG. 5A is a flowchart showing positioning processing according to the embodiment.

DESCRIPTION OF EMBODIMENT

Hereinafter, embodiments of the present disclosure will be described in detail with reference to drawings as appropriate. However, detailed description may be omitted more than necessary. For example, there are cases where a detailed description of well-known matters and redundant description on substantially the same configuration may be omitted. This is for avoiding unnecessary redundancy of the following description and facilitating understanding by those skilled in the art.

The accompanying drawings and the following description are provided to enable those skilled in the art to fully understand the present disclosure and are not intended to limit the claimed subject matters.

Configuration of Positioning System

Figure 1:
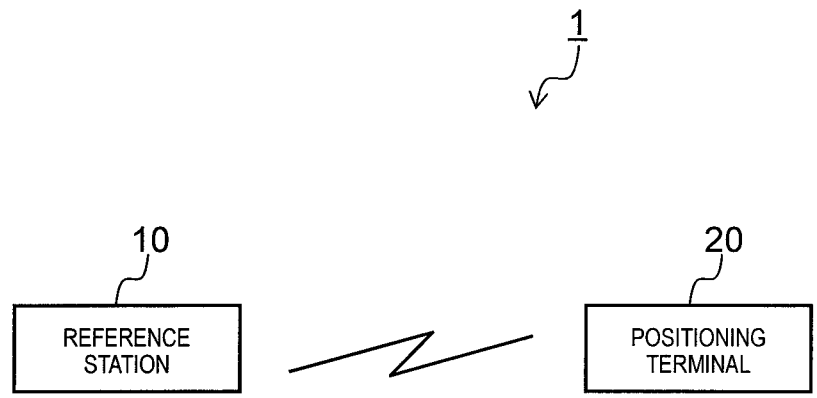
FIG. 1 is a diagram showing a configuration of a positioning system according to an embodiment.

First, the configuration of positioning system 1 according to the present embodiment will be described with reference to FIG. 1. As shown in FIG. 1, positioning system 1 includes reference station 10 and positioning terminal 20. Reference station 10 is installed at a location where the coordinates on the earth are known. Positioning terminal 20 is installed in a moving object (for example, a vehicle) to which coordinates are to be obtained.

Positioning system 1 measures the position of positioning terminal 20 and obtains the coordinates of positioning terminal 20 on the earth. The coordinates are generally three-dimensional coordinates of latitude, longitude, and altitude, for example, but may be two-dimensional coordinates such as latitude and longitude.

Reference station 10 generates positioning data (hereinafter, referred to as "reference station positioning data") of reference station 10 based on the positioning signal received from a GNSS satellite and transmits the positioning data to positioning terminal 20. Details of the positioning data will be described later.

Positioning terminal 20 generates the positioning data (hereinafter, referred to as "positioning terminal positioning data") of positioning terminal 20 based on the positioning signal received from the GNSS satellite, performs the interference positioning processing by an RTK method for each one epoch by using the reference station positioning data and the positioning terminal positioning data, and outputs the coordinates of the moving object. The epoch is data acquisition time, and an epoch interval is a time unit representing the time interval (cycle) of the data acquisition time. For example, in a case where positioning terminal 20 operates at 5 Hz, five pieces of data are acquired per second, and therefore the epoch interval is 0.2 seconds. Positioning terminal 20 includes a dedicated terminal for positioning, a personal computer having a positioning function, a smartphone, a tablet, a server that performs a positioning service, and the like.

Configuration of Reference Station

Figure 2:
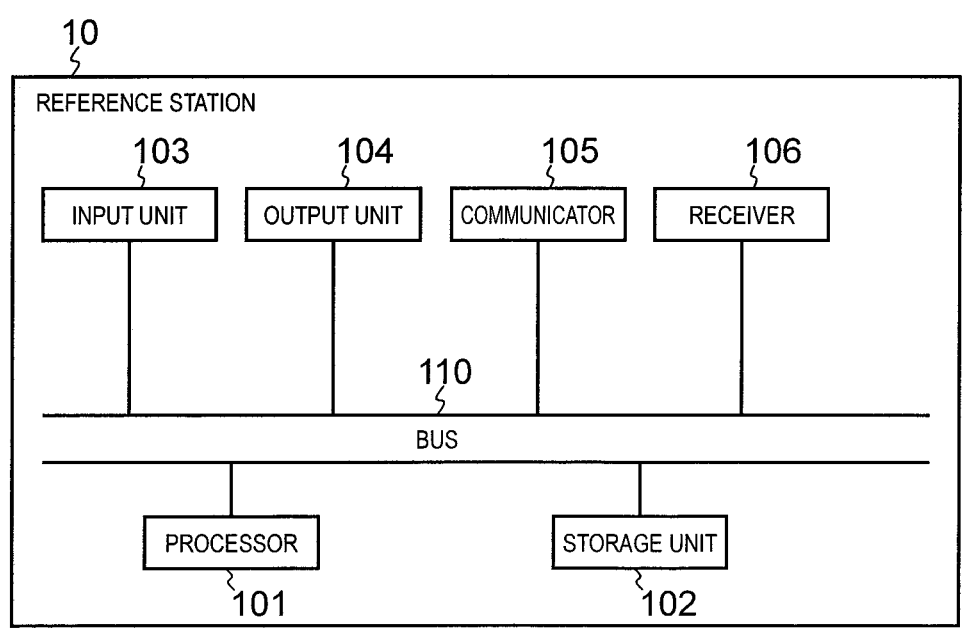
FIG. 2 is a block diagram showing a configuration of a reference station according to the embodiment.

Next, the configuration of reference station 10 according to the present embodiment will be described with reference to FIG. 2. As shown in FIG. 2, reference station 10 includes processor 101, storage unit 102, input unit 103, output unit 104, communicator 105, receiver 106, and bus 110.

Processor 101 controls other elements of reference station 10 via bus 110. As processor 101, for example, a general-purpose central processing unit (CPU) is used. In addition, processor 101 generates reference station positioning data based on the positioning signal by executing a predetermined program.

Storage unit 102 acquires various pieces of information from other elements and holds the information temporarily or permanently. Storage unit 102 is a generic name of a so-called primary storage device and secondary storage device. A plurality of storage units 102 may be physically disposed. As storage unit 102, for example, direct random-access memory (DRAM), hard disk drive (HDD), or solid-state drive (SSD) is used.

Input unit 103 receives information from the outside. The information received from the outside by input unit 103 includes information on the inputs from an operator of reference station 10. As an example, input unit 103 may be configured by using an input interface such as a keyboard.

Output unit 104 presents information to the outside. The information presented by output unit 104 includes information on positioning and the like. As an example, output unit 104 may be configured by using an existing output interface such as a display.

Communicator 105 communicates with an external device via a communication path. A device (communicating target) to communicate with communicator 105 includes positioning terminal 20. As an example, communicator 105 may be configured by using a communication interface capable of communicating with an existing communication network such as a wireless LAN communication network, 3G communication network or the like.

Receiver 106 has an antenna, performs reception processing such as amplification and down-conversion on the positioning signal from the satellite received by the antenna, and outputs the positioning signal after the reception processing to processor 101 via bus 110.

The configuration of reference station 10 is an example. It is also possible to integrate a part of each component of reference station 10. It is also possible to configure by dividing a part of each component of reference station 10 into a plurality of components. A part of respective components of reference station 10 may be omitted. It is also possible to configure by adding other components to reference station 10.

Configuration of Positioning Terminal

Figure 3:
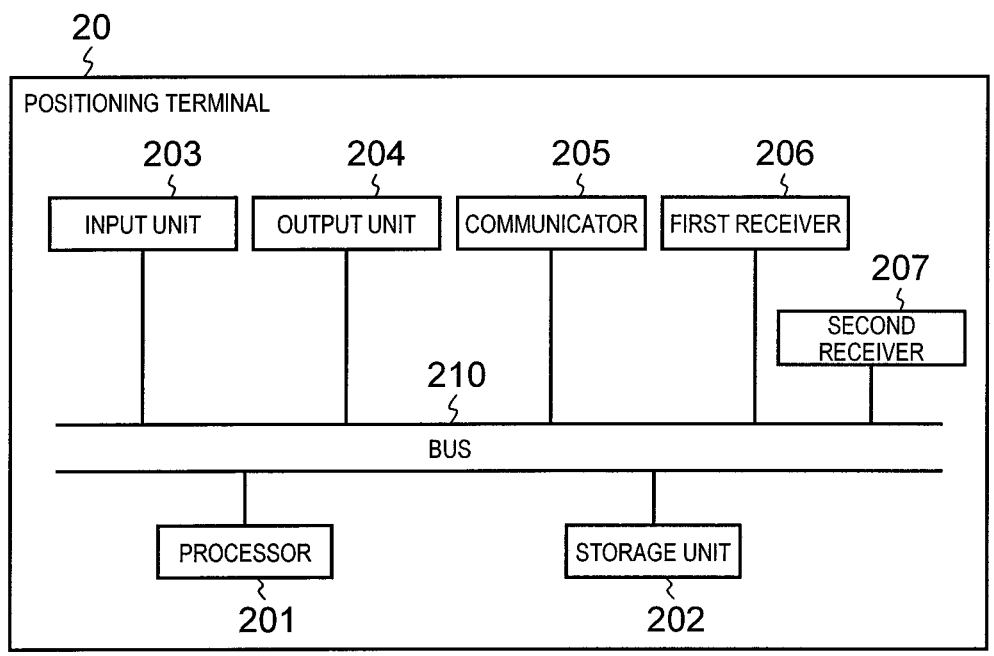
FIG. 3 is a block diagram showing a configuration of a positioning terminal according to the embodiment.

Next, the configuration of positioning terminal 20 according to the present embodiment will be described with reference to FIG. 3. As shown in FIG. 3, positioning terminal 20 includes processor 201, storage unit 202, input unit 203, output unit 204, communicator 205, first receiver 206, second receiver 207, and bus 210.

Processor 201 controls other elements of positioning terminal 20 via bus 210. As processor 201, for example, a general-purpose CPU is used. In addition, processor 201 generates first positioning terminal positioning data based on the positioning signal received by first receiver 206 (antenna A1) by executing a predetermined program and generates second positioning terminal positioning data based on the positioning signal received by second receiver 207 (antenna A2). Further, in the present embodiment, processor 201 has a function of calculating and outputting the coordinates of the moving object by using the reference station positioning data, the first positioning terminal positioning data, and the second positioning terminal positioning data. Details of the function of this processor 201 will be described later.

Storage unit 202 acquires various pieces of information from other elements and holds the information temporarily or permanently. Storage unit 202 is a generic name of a so-called primary storage device and secondary storage device. A plurality of storage units 202 may be physically disposed. As storage unit 202, for example, DRAM, HDD, or SSD is used.

Input unit 203 receives information from the outside. The information received from the outside by input unit 203 includes information on the inputs from the operator of positioning terminal 20. As an example, input unit 203 may be configured by using an input interface such as a keyboard.

Output unit 204 presents information to the outside. The information presented by output unit 204 includes information on positioning and the like. As an example, output unit 204 may be configured by using an existing output interface such as a display.

Communicator 205 communicates with an external device via a communication path. A device (communicating target) to communicate with communicator 205 includes reference station 10. As an example, communicator 205 may be configured by using a communication interface capable of communicating with an existing communication network such as a wireless LAN communication network, 3G communication network or the like.

First receiver 206 has antenna A1, performs reception processing such as amplification and down-conversion on the positioning signal from the satellite received by antenna A1, and outputs the positioning signal after reception processing to processor 201 via bus 210. Second receiver 207 has antenna A2, performs reception processing such as amplification and down-conversion on the positioning signal from the satellite received by the antenna A2, and outputs the positioning signal after the reception processing to processor 201 via bus 210. Hereinafter, the distance L between antenna A1 and antenna A2 is referred to as an "inter-antenna distance L". Further, current azimuth angle θ of the straight line connecting antenna A1 and antenna A2 is referred to as "antenna azimuth angle θ".

The configuration of positioning terminal 20 is an example. It is also possible to configure by integrating a part of each component of positioning terminal 20. It is also possible to configure by dividing a part of each component of positioning terminal 20 into a plurality of components. A part of each component of positioning terminal 20 may be omitted. It is also possible to configure by adding other components to positioning terminal 20.

Moving Object Coordinates Output Function of Processor of Positioning Terminal

Next, the function of outputting the coordinates of the moving object of processor 201 of positioning terminal 20 will be described in detail.

Processor 201 performs interference positioning (RTK calculation) using the RTK method for each epoch based on the reference station positioning data and the first positioning terminal positioning data, and based on the reference station positioning data and the second positioning terminal positioning data and calculates a positioning solution (fixed solution or float solution). Hereinafter, a positioning solution obtained by RTK calculation by using the reference station positioning data and positioning terminal positioning data (first positioning terminal positioning data or second positioning terminal positioning data) is referred to as "RTK positioning solution". A positioning solution obtained by RTK calculation by using the reference station positioning data and the first positioning terminal positioning data is referred to as a "first RTK positioning solution". A positioning solution obtained by RTK calculation by using the reference station positioning data and the second positioning terminal positioning data is referred to as a "second RTK positioning solution". The first RTK positioning solution indicates the position of antenna A1, and the second RTK positioning solution indicates the position of antenna A2.

Processor 201 performs a quality check using an ambiguity ratio (AR) value obtained by the RTK calculation, determines that the RTK positioning solution is a fixed solution in a case where the AR value is greater than or equal to a predetermined threshold (for example, 3.0), and determines that the RTK positioning solution is a float solution in a case where the AR value is less than the predetermined threshold (for example, 3.0).

In a case where one of the first RTK positioning solution and the second RTK positioning solution is a fixed solution and the other is a float solution, processor 201 narrows down the search range by using the RTK positioning solution of the fixed solution, inter-antenna distance L, and antenna azimuth angle θ. And, the processor 201 estimates an integer ambiguity within the search range of the RTK positioning solution of the float solution, as the fixed solution of the RTK positioning solution. Hereinafter, the fixed solution obtained by the above estimation processing is referred to as "estimated fixed solution".

Processor 201 sets the first RTK positioning solution and the second RTK positioning solution of the fixed solutions as current coordinates of the moving object. However, in a case where both the first RTK positioning solution and the second RTK positioning solution are float solutions, processor 201 sets the first RTK positioning solution and the second RTK positioning solution of the float solutions as the current coordinates of the moving object. In a case where an ideal result is obtained, the first RTK positioning solution and the second RTK positioning solution have coordinates separated from each other by inter-antenna distance L. Accordingly, in a case where it is necessary to output one coordinate as the current coordinates of the moving object, the coordinates of the intermediate point between the first RTK positioning solution and the second RTK positioning solution may be output. Further, if necessary, both the coordinates of the first RTK positioning solution and the coordinates of the second RTK positioning solution may be output.

Then, processor 201 outputs the current coordinates of the moving object to output unit 204 every one epoch. The flow of the positioning processing until processor 201 performs positioning and outputs the first RTK positioning solution and the second RTK positioning solution will be described later.

Positioning Data

Next, the positioning data will be described. In the present embodiment, the positioning data includes pseudo-distance information, carrier phase information, and Doppler frequency information.

Pseudo-distance information is information on the distance between the satellite and the own station thereof (reference station 10 or positioning terminal 20). The processor (processor 101 or processor 201) may calculate the distance between the satellite and the own station thereof by analyzing the positioning signal. Specifically, the processor first obtains the arrival time of the positioning signal based on two pieces of information (1) the difference between the pattern of the code carried by the positioning signal and the pattern of the code generated by the own station and (2) the signal-generated time of the satellite included in the message (NAVDATA) included in the positioning signal and the signal-received time of the own station. Then, the processor obtains the pseudo distance between the satellite and the own station thereof by multiplying the arrival time by the speed of light. This distance includes an error caused by a difference between the clock of the satellite and the clock of the own station and the like. Normally, pseudo-distance information is generated for four or more satellites to reduce this error.

The carrier phase information is the phase of the positioning signal received by the own station thereof. The positioning signal is a predetermined sinusoidal wave. The processor may calculate the phase of the positioning signal by analyzing the received positioning signal.

The Doppler frequency information is information on the relative speed between the satellite and the own station thereof. The processor may generate Doppler frequency information by analyzing the positioning signal.

As described above, the positioning data is generated by processor 101 of reference station 10 and processor 201 of positioning terminal 20, respectively.

RTK Calculation

RTK calculation will be described. The RTK calculation is an operation that executes the RTK method which is one of interference positioning.

The RTK method is to perform positioning at a predetermined point by using a carrier phase integrated value of a positioning signal transmitted by a satellite. The carrier phase integrated value is the sum of (1) the number of waves of the positioning signal from the satellite to a predetermined point and (2) the phase. Since the frequency (and wavelength) of the positioning signal is known if the carrier phase integrated value is obtained, the distance from the satellite to the predetermined point may be obtained. The number of waves of the positioning signal is called an integer ambiguity or an integer value bias since the number of waves is an unknown number.

What is important in executing the RTK method is removal of noise and estimation (determination) of integer ambiguity.

In the RTK method, noise may be removed by calculating a difference called double difference. The double difference is the difference between the values obtained by calculating the difference (single difference) between carrier phase integrated values of one receiver with respect to two satellites respectively between two receivers (in the present embodiment, reference station 10 and positioning terminal 20). In the present embodiment, four or more satellites are used for positioning using the RTK method. Therefore, the double difference is calculated by the combination of four or more satellites. In this calculation, reference station positioning data and positioning terminal positioning data are used.

In the RTK method, estimation of integer ambiguity may be performed in various ways. For example, estimation of integer ambiguity may be performed by executing the procedure of (1) estimation of a float solution by a least squares method and (2) verification of a fixed solution based on a float solution.

Estimation of a float solution by the least squares method is executed by preparing simultaneous equations by using a combination of double differences generated for each time unit and solving the prepared simultaneous equations by the least squares method. The simultaneous equations are generated for each epoch. In this calculation, the reference station positioning data, the positioning terminal positioning data, and the known coordinates of reference station 10 are used. The real number estimate of the integer ambiguity obtained in this way is called a float solution (estimated solution).

The float solution obtained in this way is a real number, whereas the true value of integer ambiguity is an integer. Therefore, it is necessary to work to round the float solution to an integer value. However, there are a plurality of candidates for combinations in rounding the float solution. Therefore, it is necessary to verify the correct integer value from the candidates.

A solution that is considered to be somewhat more reliable as an integer ambiguity by the test is called a fixed solution (precise positioning solution). In the present embodiment, the quality check is performed by using the AR value obtained by the RTK calculation, and the correct integer value is verified based on the result of the quality check. The reference station positioning data is used in order to efficiently narrow down the candidates for integer values.

Inter-antenna Distance L

In the present embodiment, as will be described later, in order to complement the first RTK positioning solution and the second RTK positioning solution, it is necessary to make the characteristics of antenna A1 and antenna A2 different. Therefore, it is desirable that inter-antenna distance L is separated to some extent. Inter-antenna distance L is constant regardless of the movement or rotation of positioning terminal 20 and is stored in storage unit 202. Processor 201 obtains the first RTK positioning solution or the second RTK positioning solution as a float solution and uses inter-antenna distance L stored in storage unit 202 when estimating the fixed solution.

Antenna Azimuth Angle θ

In a case where the first RTK positioning solution and the second RTK positioning solution are obtained as fixed solutions, processor 201 calculates antenna azimuth angle θ by using the first RTK positioning solution and the second RTK positioning solution and stores the angle in storage unit 202. In addition, when the first RTK positioning solution or the second RTK positioning solution is obtained as a float solution and the fixed solution thereof is to be estimated, processor 201 uses antenna azimuth angle θ stored in storage unit 102. Antenna azimuth angle θ changes from moment to moment due to the rotation of positioning terminal 20, but the angle is unlikely to change suddenly at an epoch interval (for example, 0.2 seconds), when estimating the fixed solution, sufficient accuracy can be obtained even if antenna azimuth angle θ calculated one epoch before is used.

In addition, in a case where positioning terminal 20 does not rotate or rotates only at a fixed angle, the angle may be used as antenna azimuth angle θ if accurate antenna azimuth angle θ can be specified. Further, in a case where either the first RTK positioning solution or the second RTK positioning solution is obtained as a float solution only, antenna azimuth angle θ calculated when both the first RTK positioning solution and the second RTK positioning solution are obtained as fixed solutions in the past may be used as they are.

Example of Coordinate Output

Next, an example of the coordinate output of positioning terminal 20 according to the present embodiment will be described with reference to FIG. 4. FIG. 4A is a diagram showing a coordinate output example of related art. FIG. 4B is a diagram showing an example of coordinate output according to the present embodiment. In FIGS. 4A and 4B, the fixed solution is indicated by a square mark, the float solution is indicated by a triangle mark, and the estimated fixed solution is indicated by a circle mark. In addition, the solution to be output is shown in black, and the solution which is not output is shown in white.

In the related art, when outputting the current coordinates of the moving object, the first RTK positioning solution and the second RTK positioning solution calculated by the RTK calculation are used as they are. In RTK calculation, once a float solution is calculated, the float solution tends to be calculated continuously thereafter. Further, in an environment where there is a lot of shielding such as an urban area, there is a high possibility that a float solution is calculated in RTK calculation. Therefore, as shown in FIG. 4A, in a method of the related art, the rate at which a float solution is calculated increases particularly in an environment with a lot of shielding.

In the present embodiment, in a case where both the first RTK positioning solution and the second RTK positioning solution calculated by the RTK calculation are fixed solutions, positioning terminal 20 calculates the current coordinates of the moving object by using the fixed solutions.

In addition, in a case where the first RTK positioning solution calculated by RTK calculation is a fixed solution and the second RTK positioning solution is a float solution, positioning terminal 20 sets a search range centered on the position of antenna A2 based on the first RTK positioning solution, inter-antenna distance L, and antenna azimuth angle θ and uses the integer ambiguity within the search range as an estimated fixed solution of the second RTK positioning solution. Then, positioning terminal 20 calculates the current coordinates of the moving object by using the fixed solution of the first RTK positioning solution and the estimated fixed solution of the second RTK positioning solution (timing T401).

In addition, in a case where the first RTK positioning solution calculated by RTK calculation is a fixed solution and the second RTK positioning solution is a fixed solution, positioning terminal 20 sets a search range centered on the position of antenna A1 based on the second RTK positioning solution, inter-antenna distance L, and antenna azimuth angle θ and uses the integer ambiguity within the search range as an estimated fixed solution of the first RTK positioning solution. Then, positioning terminal 20 calculates the current coordinates of the moving object by using the estimated fixed solution of the first RTK positioning solution and the fixed solution of the second RTK positioning solution (timing T402).

Thus, in the present embodiment, in a case where one of the first RTK positioning solution and the second RTK positioning solution is a fixed solution and the other is a float solution, for the antenna for which the float solution is calculated, an integer ambiguity is searched within the range estimated from the fixed solution of the other antenna, and a fixed solution is estimated.

Accordingly, since a float solution can be quickly returned to a fixed solution, as shown in FIG. 4B, the rate at which the float solution is calculated can be reduced and the rate at which the fixed solution is calculated can be increased.

Flow of Positioning Processing

Figure 5B:
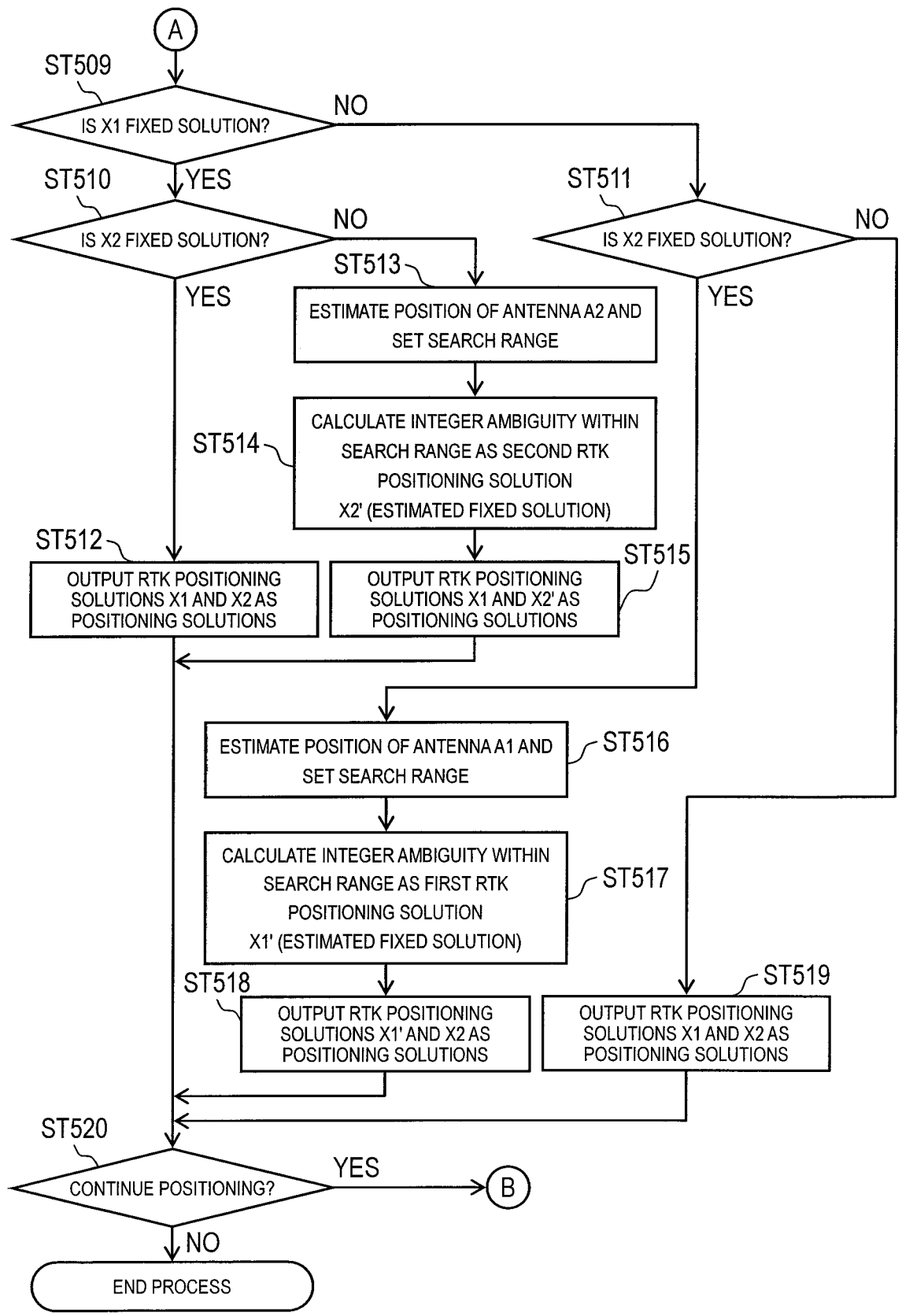
FIG. 5B is a flowchart showing positioning processing according to an embodiment.

Next, the flow of the positioning processing according to the present embodiment will be described with reference to FIGS. 5A and 5B. In the present embodiment, an example in which positioning terminal 20 performs positioning processing will be described. However, the positioning processing according to the present disclosure is not limited to being performed by positioning terminal 20 and may be executed by a general-purpose computer added inside positioning system 1, for example. The timing of starting positioning processing is not particularly limited. For example, the positioning processing may be started when the power of positioning terminal 20 is turned on. In addition, the positioning processing may be started when a command to start the positioning processing is input by input unit 203 of positioning terminal 20.

First, in ST501, first receiver 206 (antenna A1) and second receiver 207 (antenna A2) each receive positioning signals from all receivable satellites. Then, in ST502 and 503, processor 201 generates the first positioning terminal positioning data by using the positioning signal received by first receiver 206, and the second positioning terminal positioning data by using the positioning signal received by second receiver 207. In ST504, communicator 205 receives reference station positioning data from reference station 10.

Next, in ST505, processor 201 executes RTK calculation by using the reference station positioning data and the first positioning terminal positioning data to calculate first RTK positioning solution X1. In ST506, processor 201 executes RTK calculation by using the reference station positioning data and the second positioning terminal positioning data to calculate second RTK positioning solution X2.

Next, in ST507, processor 201 checks the positioning quality of first RTK positioning solution X1 and checks whether or not first RTK positioning solution X1 is a fixed solution. In ST508, processor 201 checks the positioning quality of second RTK positioning solution X2 and checks whether second RTK positioning solution X2 is a fixed solution.

In a case where both first RTK positioning solution X1 and second RTK positioning solution X2 are fixed solutions (ST509: YES, ST510: YES), in ST512, processor 201 outputs first RTK positioning solution X1 and second RTK positioning solution X2 as positioning solutions (current coordinates of the moving object). The flow proceeds to ST520.

Also, in a case where first RTK positioning solution X1 is a fixed solution and second RTK positioning solution X2 is a float solution (ST509: YES, ST510: NO), in ST513, processor 201 estimates the position of antenna A2 based on first RTK positioning solution X1, inter-antenna distance L, and antenna azimuth angle θ and sets a region within a circle with radius R centered on the estimated position as a search range.

Next, in ST514, processor 201 calculates an integer ambiguity within the search range as second RTK positioning solution X2' (estimated fixed solution) in the RTK calculation executed in ST506.

In ST515, processor 201 outputs first RTK positioning solution X1 and second RTK positioning solution X2' as positioning solutions (current coordinates of the moving object). The flow proceeds to ST520.

Also, in a case where first RTK positioning solution X1 is a float solution and second RTK positioning solution X2 is a fixed solution (ST509: NO, ST511: YES), in ST516, processor 201 estimates the position of antenna A1 based on second RTK positioning solution X2, inter-antenna distance L, and antenna azimuth angle θ and sets a region within a circle with radius R centered on the estimated position as a search range.

Next, in ST517, processor 201 calculates an integer ambiguity within the search range as first RTK positioning solution X1' (estimated fixed solution) in the RTK calculation executed in ST505.

In ST518, processor 201 outputs first RTK positioning solution X1' and second RTK positioning solution X2 as positioning solutions (current coordinates of the moving object). The flow proceeds to ST520.

In a case where both first RTK positioning solution X1 and second RTK positioning solution X2 are float solutions (ST509: NO, ST511: NO), in ST519, processor 201 outputs first RTK positioning solution X1 and second RTK positioning solution X2 as positioning solutions (current coordinates of the moving object). The flow proceeds to ST520.

In a case where the positioning is not continued in ST518 (ST520: NO), the positioning processing ends. On the other hand, in a case where positioning is continued (ST520: YES), the flow returns to ST501.

Effect

As described above, in the present embodiment, in a case where one of the first RTK positioning solution and the second RTK positioning solution is a fixed solution and the other is a float solution, for the antenna for which the float solution is calculated, an integer ambiguity is searched within the range estimated from the fixed solution of the other antenna, and a fixed solution is estimated.

As a result, a float solution can be quickly returned to a fixed solution, even in an environment where there is a lot of shielding, the rate at which the float solution is calculated can be reduced and the rate at which the fixed solution is calculated can be increased.

Thereby, in the RTK calculation, the rate at which a float solution is calculated can be reduced, and the rate at which a fixed solution is calculated can be increased.

In addition, in the present embodiment, the solution that is a float solution is quickly returned to a fixed solution by using the solution of the first RTK positioning solution and the second RTK positioning solution that is the fixed solution. As a result, in the present embodiment, as long as both RTK positioning solutions will not be float solutions almost simultaneously, both RTK positioning solutions can be quickly made fixed solutions, and therefore, the time for which float solutions are calculated can be kept short.

In the present embodiment, both the first RTK positioning solution and the second RTK positioning solution are calculated by the same method (interference positioning). Therefore, regardless of which RTK positioning solution is a float solution, the RTK positioning solution can be returned to a fixed solution at the same speed. That is, in the present embodiment, stable positioning can be performed even in a situation where it is difficult to predict which of the first RTK positioning solution and the second RTK positioning solution will be a float solution due to factors such as frequent changes in the position of a shielding object. As an example of such a situation, a vehicle traveling on a highway can be considered. On highways and the like, there are many cases where there is a shielding object such as a high wall on one of the left and right sides, but there is no shielding object on the other side, and whether the wall exists on the left or right is switched depending on the traveling position. Therefore, by using the present embodiment, antenna A1 and antenna A2 are spaced apart from each other in the left and right, thereby reducing the rate at which both the first RTK positioning solution and the second RTK positioning solution simultaneously will be float solutions and outputting an accurate position of a vehicle or the like stably.

In the present disclosure, the type, placement, the number, and the like of the members are not limited to the above-described embodiments, and the components thereof may be appropriately replaced with ones having the same effect and may be appropriately changed without departing from the gist of the invention.

For example, in the above embodiment, the case where the number of receivers (number of antennas) of positioning terminal 20 is "2" has been described, but the present disclosure is not limited thereto, and the number of receivers (the number of antennas) of positioning terminal 20 may be "3 or more".

In the above embodiment, the case where the estimated value based on the antenna azimuth angle immediately before based on the fixed solutions indicating the positions of antenna A1 and antenna A2 is used as current antenna azimuth angle θ has been described, but the present disclosure is not limited thereto. For example, in a situation where accurate antenna azimuth angle θ can be specified, such as positioning terminal 20 does not rotate or rotates only at a fixed angle, the angle may be used as current antenna azimuth angle θ. In a case where at least one of the previous antenna positions is a float solution, if current antenna azimuth angle θ is estimated based on this float solution, an inaccurate estimation result may be obtained. Therefore, in a case where the position of one of the antennas can only be obtained with a float solution, instead of estimating antenna azimuth angle θ based on the previous antenna position, antenna azimuth angle θ calculated when the positions of both antennas were obtained as fixed solutions in the past may be used as they are. Further, current antenna azimuth angle θ need not be a single value and may be an estimated range of current antenna azimuth angle θ. Also in this case, since the search range of the RTK positioning solution that is a float solution can be narrowed, the float solution can be quickly returned to a fixed solution.

In the above embodiment, the case where the coordinates indicated by the first RTK positioning solution and the second RTK positioning solution, respectively, or the coordinates of the intermediate point between the first RTK positioning solution and the second RTK positioning solution are output has been described, but the present disclosure is not limited thereto. For example, based on the coordinates of one RTK positioning solution, the theoretical coordinates of the other RTK positioning solution is calculated, and the coordinates of that intermediate point is output, and therefore, coordinates corresponding to intermediate point can be output even if only one RTK positioning solution is used. In this case, if one RTK positioning solution is a fixed solution and the other RTK positioning solution is a float solution, the float solution is not reflected in the output, and an intermediate point between the coordinates indicated by the fixed solution and the theoretical coordinates calculated by reflecting inter-antenna distance L and the antenna azimuth angle θ in the fixed solution is output. As a result, the position of the moving object can be output without reflecting a low-accuracy float solution. Further, when there is a restriction on the antenna arrangement, the intermediate point between the first RTK positioning solution and the second RTK positioning solution is not always the desired coordinates. Therefore, coordinates obtained by appropriately processing the coordinates indicated by each RTK positioning solution may be output according to desired coordinates.

In addition, in the above embodiment, the case of performing the RTK calculation as an example of the positioning calculation has been described, but the present disclosure is not limited thereto and a positioning calculation other than the RTK calculation may be performed.

In the above embodiment, the case where inter-antenna distance L is stored in storage unit 202 in advance assuming a state where the distance is known at the time of designing positioning terminal 20 has been described, but the present disclosure is not limited thereto. Positioning terminal 20 measures the position of an object, based on the positions of antennas A1 and A2, to which antennas are attached. Therefore, antennas A1 and A2 may be attached to an object (positioning object) different from positioning terminal 20. In this case, the installation positions of antennas A1 and A2 are restricted by various factors such as the size and design of the positioning object. For example, it is difficult to attach an antenna having inter-antenna distance L of several meters to a small terminal such as a smartphone. In consideration of such restrictions, it may be more advantageous to provide positioning terminal 20 that can separately attach antennas A1 and A2 to any location of a positioning object rather than providing positioning terminal 20 having a predetermined antenna arrangement. In a case where antennas A1 and A2 can be attached to arbitrary locations, inter-antenna distance L is not determined at the time of designing positioning terminal 20. For this reason, it is desirable to measure inter-antenna distance L at the time of installing the antennas and store the measured value in storage unit 202. The measurement of inter-antenna distance L may be performed manually by an antenna installer or may be performed by calculating inter-antenna distance L based on the positions indicated by fixed solutions in a case where the fixed solutions are obtained simultaneously for the positions of the respective antennas. Further, when antennas A1 and A2 can be attached to arbitrary locations, antennas A1 and A2 and positioning terminal 20 may be provided separately. For example, positioning terminal 20 may be configured to receive a signal from a commercially available antenna and calculate the position of the antenna based on the received content. In the case of a configuration where antennas A1 and A2 can be moved to an arbitrary place, or in a case where the shape of the positioning object is variable, it is also conceivable that inter-antenna distance L changes from the content stored in storage unit 202. Therefore, instead of continuing to use inter-antenna distance L once stored, it may be possible to update as necessary. When updating inter-antenna distance L, the above measurement is performed again.

In the above embodiment, the search range for a fixed solution is determined based on one antenna azimuth angle θ, but the present disclosure is not limited thereto. Antenna azimuth angle θ changes at any time according to the rotation of the object to which the antennas are attached. Therefore, in consideration of this change, antenna azimuth angle θ may be a plurality of values or a value having a predetermined width. In this case, if the search range is simply set based on inter-antenna distance L and antenna azimuth angle θ, the search range is widened compared to the above embodiment, and it is difficult to search for a fixed solution. Therefore, in a case where antenna azimuth angle θ has a plurality of values or a width, the radius of the search range may be shortened instead. This configuration is particularly effective in a case where a current rotation direction can be estimated from the history of changes in the antenna azimuth angle. That is, in a state where the object rotates in a certain direction, since there is a low possibility that a fixed solution is calculated from the position in the reverse direction, it is possible to calculate the fixed solution at a higher speed by narrowing the search range in a direction that matches the rotation direction.

Each functional block used in the description of the above embodiment is typically realized as an LSI which is an integrated circuit. These may be individually made into one chip, or may be made into one chip so as to include a part or all thereof. The name used here is LSI, but may also be called IC, system LSI, super LSI, or ultra LSI depending on the degree of integration.

Further, the method of circuit integration is not limited to LSI, and implementation using dedicated circuitry or general purpose processors is also possible. A field programmable gate array (FPGA) that can be programmed after manufacturing the LSI or a reconfigurable processor in which the connection and setting of circuit cells inside the LSI can be reconfigured may be used.

Further, if integrated circuit technology comes out to replace LSI as a result of the advancement of semiconductor technology or a derivative other technology, it is naturally also possible to carry out function block integration using this technology. Biotechnology can be applied.

INDUSTRIAL APPLICABILITY

The present disclosure is suitable for use when performing interference positioning by using a signal from a satellite.

REFERENCE MARKS IN THE DRAWINGS

1 POSITIONING SYSTEM
10 REFERENCE STATION
20 POSITIONING TERMINAL
101, 201 PROCESSOR
102, 202 STORAGE UNIT
103, 203 INPUT UNIT
104, 204 OUTPUT UNIT
105, 205 COMMUNICATOR
106 RECEIVER
110, 210 BUS
206 FIRST RECEIVER
207 SECOND RECEIVER

The invention claimed is:

1. A positioning method for determining coordinates of a moving object, the method comprising:
    performing a positioning calculation based on information included in positioning signals transmitted from a plurality of satellites and received by a plurality of antennas;
    calculating a float solution for a first antenna via the positioning calculation;
    calculating a fixed solution for a second antenna via the positioning calculation, the fixed solution being a solution obtained by increasing an accuracy of a float solution for the second antenna;
    estimating a position of the first antenna based on the fixed solution for the second antenna; and
    estimating a fixed solution for the first antenna by increasing the accuracy of the float solution for the first antenna in a search range including the estimated position of the first antenna.

2. The positioning method of claim 1,
    wherein the search range is a circle with a predetermined radius centered on the estimated position.

3. The positioning method of claim 1,
wherein the position of the first antenna is estimated from the fixed solution for the second antenna, a distance between the first antenna and the second antenna, and an azimuth angle of a straight line connecting the first antenna and the second antenna.

4. The positioning method of claim 1,
wherein the fixed solution for the first antenna is estimated by determining an integer ambiguity within a search range including the estimated position of the first antenna based on the float solution for the first antenna.

5. The positioning method of claim 1, further comprising:
outputting coordinates of the moving object calculated by using the fixed solution estimated for the first antenna and the fixed solution calculated for the second antenna.

6. The positioning method of claim 1, further comprising:
estimating a position of the second antenna based on a subsequent fixed solution for the first antenna.

7. A positioning terminal comprising:
a processor configured to:
   determine coordinates of a moving object by performing a positioning calculation based on information included in positioning signals transmitted from a plurality of satellites and received by a plurality of antennas;
   calculate a float solution for a first antenna via the positioning calculation;
   calculate a fixed solution for a second antenna via the positioning calculation, the fixed solution being a solution obtained by increasing an accuracy of a float solution for the second antenna;
   estimate a position of the first antenna based on the fixed solution for the second antenna; and
estimate a fixed solution for the first antenna by increasing the accuracy of the float solution for the first antenna in a search range including the estimated position of the first antenna.

* * * * *